No. 642,390. Patented Jan. 30, 1900.
F. P. VAN DENBERGH.
PROCESS OF MAKING SULFURIC ACID.
(Application filed Apr. 11, 1896. Renewed June 15, 1899.)
(No Model.)
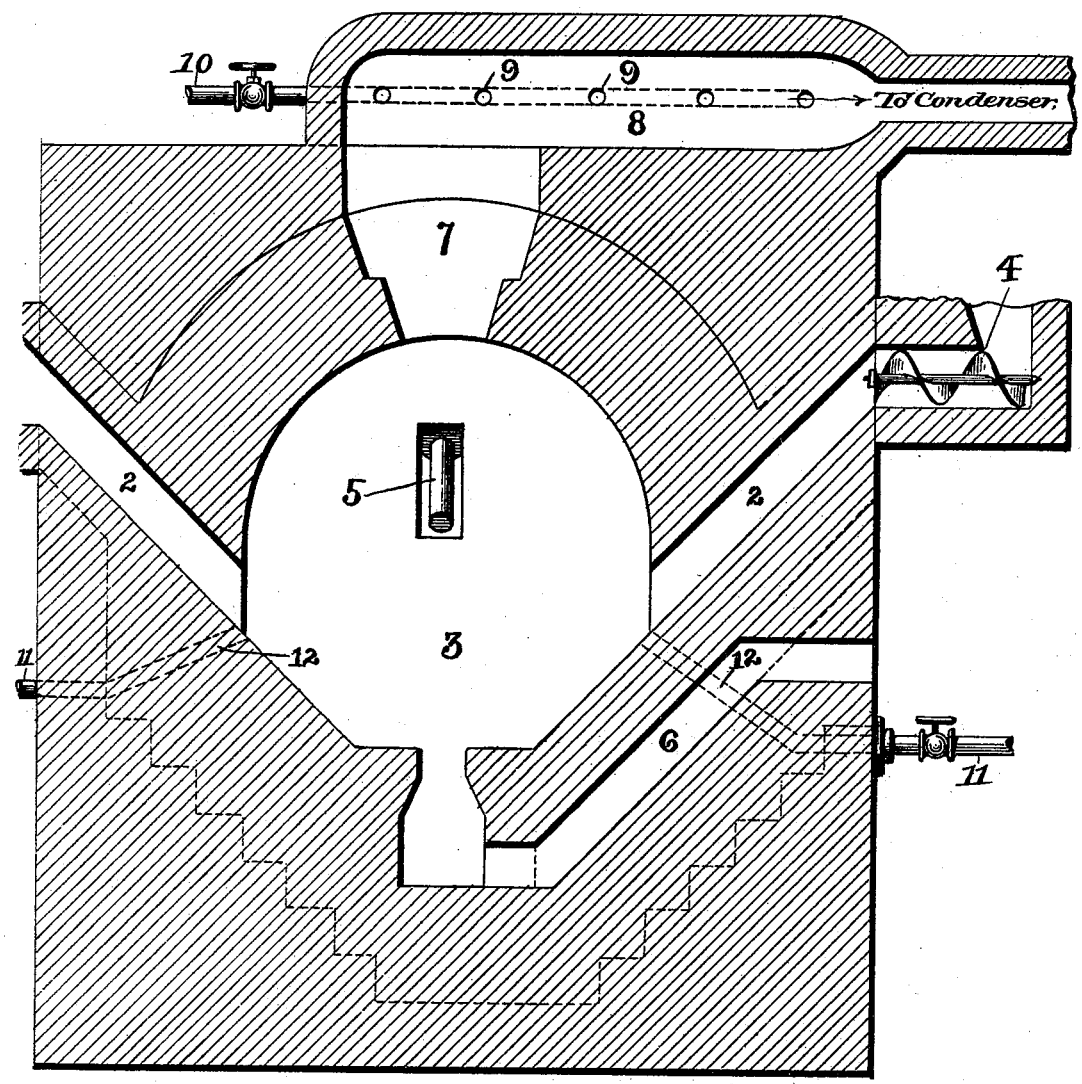
Witnesses
L. C. Hills
Geo. T. May, Jr.
Inventor:
Frank P. Van Denbergh,
By William Macomber
and J. V. Barker Attorneys

UNITED STATES PATENT OFFICE.

FRANK P. VAN DENBERGH, OF BUFFALO, NEW YORK.

PROCESS OF MAKING SULFURIC ACID.

SPECIFICATION forming part of Letters Patent No. 642,390, dated January 30, 1900.

Application filed April 11, 1896. Renewed June 15, 1899. Serial No. 720,709. (No specimens.)

*To all whom it may concern:*

Be it known that I, FRANK P. VAN DENBERGH, a citizen of the United States, residing at Buffalo, New York, have invented certain new and useful Improvements in the Art or Process of Making Sulfuric Acid; and I do hereby declare the following to be a full, clear, and exact description of the same, such as will enable those skilled in the art to which it appertains to employ the same.

More particularly, my invention relates to a new and improved art or process for the production of sulfuric acid from gypsum or native sulfate of calcium or other materials containing sulfur or its salts by means of heat and electrolysis, both produced by an electric current, with or without the presence of additional oxidizing and hydrating agent or agents.

In order to distinguish my process from that hitherto employed, reference will now be made to the common means of producing sulfuric acid. In following the common methods sulfur, iron pyrites, or copper pyrites are burned in a furnace especially constructed for the purpose, and the vapors of sulfur dioxid which result are passed over a series of pots or through a chamber containing nitrate of soda or other material capable of yielding the oxids of nitrogen. These fumes are together discharged from the furnace or series of furnaces into a lead-lined tower filled with coke or vitrified brick or other acid-resisting material, and after being denitrated by sulfuric acid, which is sprayed from above downward, the fumes are discharged into very large chambers, whose walls are made of sheet-lead. The lead surface of these chambers is usually very great, aggregating in some instances a total area equal to several acres. The acid-vapors are conducted from one of these lead chambers to another and are finally discharged into a Guy-Lussac tower, lead-lined and similar in construction to the tower first mentioned. The acid thus produced is what is known commercially as "chamber-acid" and contains from forty to sixty per cent. of water, and to remove this water it is necessary to concentrate the acid by evaporating it in glass or platinum vessels. The glass vessels are very liable to fracture, involving loss of apparatus and material and also injury to workmen and plant. The platinum stills or pans are expensive, and therefore greatly increase the investment necessary for a sulfuric-acid plant. Whether the acid made in this way is obtained from brimstone or pyrites it is impure, and that from pyrites especially contains a large proportion of arsenic and other deleterious substances from which it is absolutely necessary for many purposes to purify the acid. The purification involves further expense and time.

My invention has for its object to utilize an abundant raw material having at present but little value in the industrial arts, to lessen the time and cost of producing sulfuric acid, and at the same time to avoid the necessity of purifying the acid for many of the purposes for which it is now necessary to purify it, especially all purification necessary for the elimination of arsenic.

In carrying out my invention instead of reacting upon the sulfurous and sulfuric oxids obtained by burning sulfur or sulfids with nirogen oxids obtained by heating saltpeter, and thus by slow and expensive means obtaining an impure sulfuric acid, I use gypsum or native sulfate of calcium or other suitable materials containing sulfur or its salts and any suitable flux—such as ordinary sand, gravel, quartz, clay, shale, cullet, or other suitable material containing silica—and these I reduce to a molten mass within the furnace-chamber by the heat of the electric current. This fusion of the materials is caused to take place in an atmosphere which contains an excess of oxygen, which is supplied by any suitable means, such as hematite iron ore or other suitable solid, which may be mixed with the materials fed into the furnace, or by steam, air, oxygen, ozone, or other suitable oxygen-yielding gas which may be injected into the furnace, so that the decompositions and reactions which take place in the molten bath and the gases which are given off therefrom take place and are in the presence of an excessive supply of free oxygen, or oxygen which is in a nascent state. This bath or molten mass is subject to intense heat and also to electrolysis, both due to the electric current, the heat principally serving to reduce the materials to a fluid condition and the electrolysis serving principally to effect decomposition of the materials. The gypsum and flux being together introduced into the furnace, the first effect is to fuse the silica ($SiO_2$) of the flux. Subsequently the gypsum under the influence of the electric current is decomposed, and the sulfur oxids being liberated in an atmosphere containing an excess of free oxygen sulfur trioxid is formed, the reactions taking place being indicated by the formula $SO_4Ca + SiO_2 = SiO_3Ca$ (silicate of calcium, which passes off with the residuum as a slag) and $SO_3$. While sulfur dioxid ($SO_2$) may be produced as an intermediate product, it is almost immediately converted into the trioxid, owing to the excess of free oxygen present. The sulfur trioxid thus formed is next hydrated to form sulfuric acid, ($SO_4H_2$,) and to cause this reaction I prefer to supply the necessary hydrogen and oxygen by introducing steam into the furnace, so that it will commingle with the gases passing from the furnace, including the sulfur trioxid, and combine with this latter, as indicated by the formula $SO_3 + H_2O = SO_4H_2$.

In operating according to my process the gypsum or other material containing the sulfur and the flux material are first broken or crushed to such a condition as to permit and facilitate feeding them into an electric furnace and also facilitate their fusion. The electric furnace employed may be of any desired type, provided it has a properly-closed chamber and a proper exit for the vapors generated connected with a condensing apparatus. It is especially advantageous, however, to employ a furnace affording a continuous process of reduction—that is, of fusion and decomposition.

In the drawing accompanying this case I have illustrated in central transverse section an electric furnace adapted to the carrying out of my invention, all details of construction and arrangement being omitted in so far as permissible with a showing of an apparatus sufficient for a clear understanding of my process.

Referring to the drawing, 2 2 represent feed-passages, though which the material to be operated upon is introduced into the body of the furnace 3. In connection with one of the passages 2 is a conventional representation of an automatic and continuous feeding device, a worm or screw feed being represented at 4.

5 represents one of the electrodes, of which any suitable number may be employed and which may be mounted in any desired manner.

The fused slag passes off through the discharge-conduit 6, and the vapors or gases generated within the furnace-chamber are discharged through an opening 7 into a trunk or conduit 8, which is connected with a condensing apparatus, the latter not being shown.

9 9 are openings into the trunk or conduit 8, through which steam may be introduced into the latter, the steam being supplied from a pipe 10. It is in this trunk, chamber, or conduit 8 that the main portion of the hydration of the oxid-vapors from the furnace takes place, the steam or water vapor supplied through the apertures 9 supplying the elements for such hydration.

11 11 indicate steam-pipes connected with openings or passages 12, leading into the body of the furnace. Through these vapor of water may be discharged directly into the furnace-chamber when conditions require that this should be done.

The material to be treated is introduced into the furnace and brought into contact with the electric current and is rapidly converted into a molten mass. The exact amount of flux which is used cannot be stated arbitrarily, owing to the variations in the character and richness of the materials which may be used and must be in each case relatively determined, as it may be by any person skilled in the art of smelting ores. Likewise the volume and quality of the electric current employed as hereinbefore set forth, for the purposes of heat and electrolysis will be determined by the work being done and the character of the materials being treated.

For the complete and certain oxidation and hydration of the sulfur-gases, as before set forth, it is usually desirable to project a jet of steam directly into the furnace, and its quantity must also be determined by the quality of the native materials being operated upon and their quantity. However, the material used in carrying out my process is such and its physical condition, being broken into small pieces, is such that large volumes of air are necessarily delivered into the furnace-chamber along with the material. The materials used also carry with them a considerable and often very large amount of water, so that it is not always necessary to introduce the steam into the furnace. Whether or not this is necessary has to be determined by the condition of the material being operated upon.

A great economy in manufacture is effected by the employment of gypsum in the carrying out of my process from the fact that the resulting acid is chemically pure, so far as arsenic and nitrogen oxids are concerned, these being the impurities most commonly met with in sulfuric acid as now ordinarily made and requiring expensive purifying processes in order to free the acid from their presence. I therefore prefer to use gypsum, as it is not only a cheap raw material and widely distributed in very large quantities, but it produces when treated as I have described a product which is practically free from all impurities, those other than the ones which are above named being carried away in the slag formed by the flux used.

My method of condensing the vapors is not essentially different from those commonly employed, and I may use any successful system. I do not, however, restrict or limit my invention to the particular means described for carrying out the process, as any one or all of the means may be varied without departing from the spirit of my invention.

Having thus described my invention, what I claim is—

1. In the art of manufacturing sulfuric acid, the herein-described process, which consists in subjecting a material containing sulfur to heat and electrolysis produced by an electric current within a furnace, and applied directly to the material while in a molten condition, in the presence of an excess of free oxygen, thereby forming sulfur oxids, and subsequently hydrating these, substantially as set forth.

2. In the art of manufacturing sulfuric acid, the herein-described process which consists in subjecting calcium sulfate or gypsum to heat and electrolysis both produced by an electric current within a furnace, and applied directly to the material while in a molten condition, and in the presence of an excess of oxygen, thereby forming sulfur oxids, and subsequently hydrating these oxids, substantially as set forth.

3. In the art of manufacturing sulfuric acid free from arsenic, nitrogen oxids, and other common impurities, the herein-described process which consists in subjecting calcium sulfate or gypsum and a flux to heat and electrolysis, both produced by an electric current within a furnace-chamber containing the materials, and applied directly to and through them while in a molten condition in the presence of an excess of oxygen, thereby forming sulfur oxids, and subsequently hydrating these oxids, substantially as set forth.

In testimony that I claim the invention above set forth I affix my signature in presence of two witnesses.

FRANK P. VAN DENBERGH.

Witnesses:
CLINTON B. GIBBS,
LYNDON D. WOOD.